Patented Jan. 6, 1953

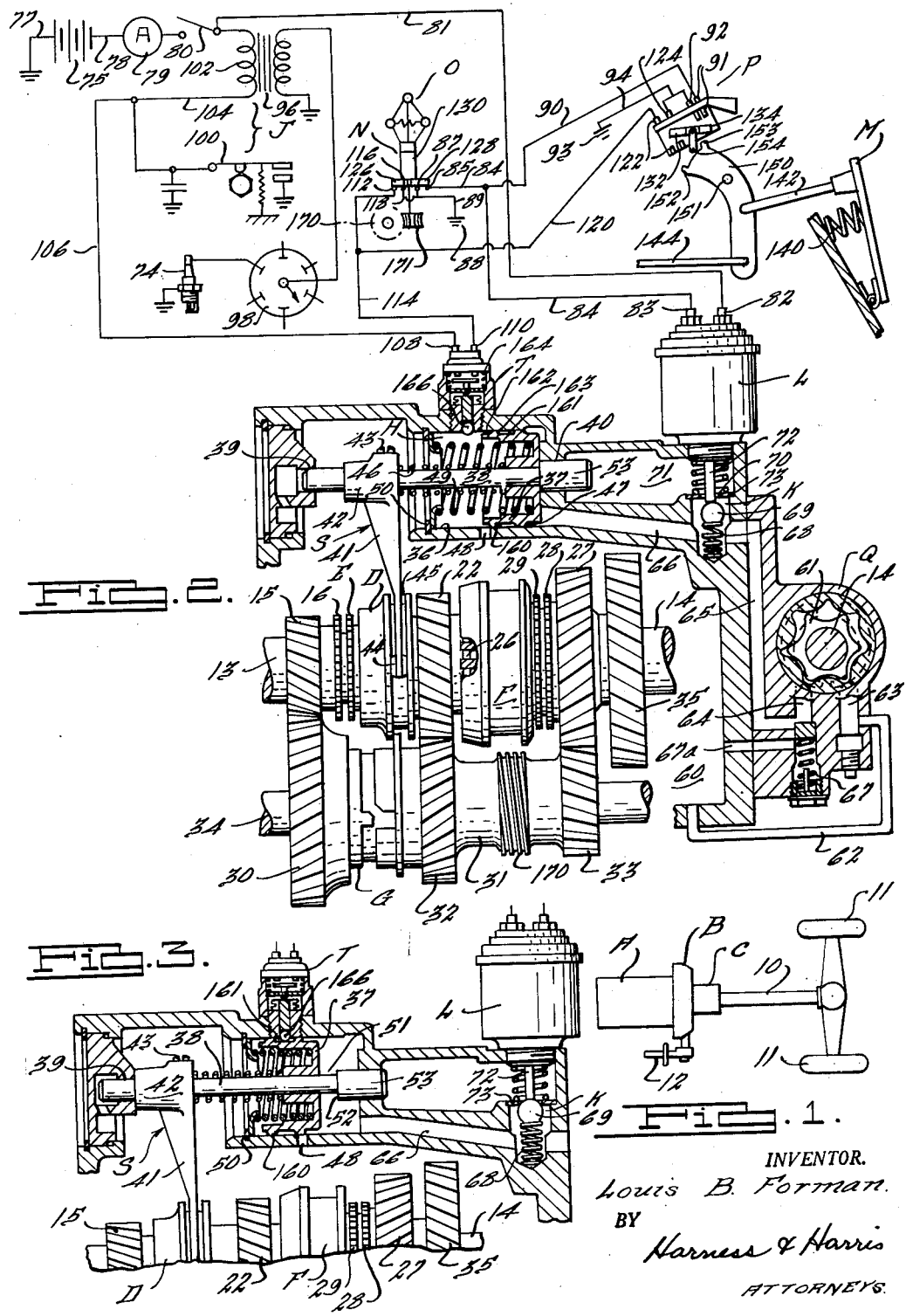

2,624,208

UNITED STATES PATENT OFFICE 2,624,208

TRANSMISSION CONTROL SYSTEM

Louis B. Forman, Detroit, Mich., assignor to Chrysler Corporation, Highland Park, Mich., a corporation of Delaware Application July 24, 1951, Serial No. 238,301

9 Claims. (Cl. 74—472)

This invention relates to motor vehicles and refers more particularly to power transmissions and control systems therefor.

My invention has particular reference to transmission control systems wherein the disengagement of positively engageable drive control elements is facilitated by relieving the torque load on these elements as by momentary interruption of the engine ignition system. Examples of transmissions of this character are described in the patents to Carl A. Neracher et al. 2,455,943, granted December 14, 1948, and Augustin J. Syrovy et al. 2,490,604, granted December 6, 1949.

It has been customary, as shown by the aforesaid patents, to provide a shiftable drive control element of toothed character arranged to interengage with a second toothed drive control element after passing through a toothed blocker. Engagement occurs upon synchronism obtaining between the drive control elements subsequent to engine deceleration by accelerator releasing movement, and the shiftable element is adapted to be unloaded, as described above, to facilitate its disengagement from its companion drive control element.

The drive control elements are generally so arranged in the transmission that upon relative engagement under governor control at or above a predetermined vehicle speed, there is provided a fast speed ratio drive through the transmission, usually a direct drive, and when relatively disengaged under governor control below a predetermined speed, or by kickdown means such as accelerator actuated switch means overruling the governor, there is provided another speed ratio drive which is usually a slower speed ratio drive than the first mentioned one.

Also customarily provided are prime mover or differential pressure servomotor means which may comprise a spring and a hydraulic or vacuum operated motor having a movable piston, for controlling shift of the shiftable drive control element through an associated shift rail or lever member through an associated shift rail or lever system. In the case of the hydraulic system, as typified by the Syrovy et al. patent aforesaid, pressure fluid acting upon the piston will cause it to compress a disengaging spring and an engaging spring, and build up sufficient available force in the latter to move the shift rail and by it the shiftable drive control element against its blocker and then into engagement with its companion drive control element when synchronization of the drive control elements subsequently occurs.

In the case of the vacuum power system, as typified by the Neracher et al. patent, vacuum is utilized to cause the piston to compress a disengaging spring and through a rod extension of the piston, unload an engaging spring previously tensioned by operation of the rod, the latter spring in turn acting upon a lever to effect movement of the shiftable element against its blocker and into subsequent engagement with its companion drive control element when the drive control elements obtain synchronism.

Transmission systems of the aforesaid typical character also usually include electromagnetically controlled valving for controlling venting (admission of atmospheric pressure) of the servomotor and operation of the piston such that when the motor is vented, the disengaging spring actuates the piston to effect disengaging shift of the shiftable drive control element accompanied by ignition interruption, the latter occurring as an incident to available lost motion operation of the piston relative to the shift rail in Syrovy et al., and the piston rod relative to the lever operating member in Neracher et al.

Customarily there is also provided an ignition interrupter switch operated by movement of the piston in Syrovy et al. or by the piston rod in Neracher et. al. Moreover, as in the above patents, there is provided an electrical system intended to accomodate interruption of the engine ignition only during the disengaging stroke of the piston, it being so arranged that even though the ignition interruption switch closes on the return (engaging) stroke, the ignition is not ordinarily grounded out because at such time neither of the parallel arranged kickdown and governor switches which are arranged in series with the ignition interrupter switch and in series with the valve solenoid in a parallel circuiting is closed. Hence firing of the engine is not usually interrupted during acceleration from vehicle standstill in the slower speed ratio drive.

Although the foregoing described arrangements have in general been satisfactory, they have been open to one or more unforeseen conditions of operation which it is desirable to avoid.

In use, in the arrangement disclosed by Neracher et al. and Syrovy et al., especially where a higher resistor type of ignition harness has been employed, some lurching of the vehicle has been noticeable in vehicle operation during upshifts. It is believed that in a circuiting wherein actuation of the interrupter switch places the ignition primary coil and the solenoid of the control valve in parallel circuits, the solenoid coil acts as a parallel impedance of low value to the primary coil of the ignition and causes the spark delivered by the secondary at the plugs at the time of current flow thereto to be weakened. In this connection, it may be observed that under normal engine operation the higher the engine R. P. M., the lower is the secondary voltage, and since the upshift takes place at a substantial R. P. M. the effect of the low impedance is to weaken the spark sufficiently so that it may be unable to keep the engine running momentarily, as by causing the engine to misfire. This condition can occur, for example, in the Neracher et al. arrangement and in the Syrovy et al. system when the relay coil of the latter has a low impedance effect on the ignition primary.

An object of my invention is to provide an improved ignition interruption control adapted for use, for example, with a transmission control system of the types disclosed in the aforesaid patents and which is capable of operation without weakening the ignition during the return, i. e., upshift stroke of the piston.

Another object of the invention is to provide a transmission shift control system having means for interrupting the engine ignition when effecting a downshift, but which system inhibits weakening of the ignition spark intensity during the upshifting operations.

Still another object is to provide a transmission control system including ignition interrupting means and speed responsive and accelerator controlled differential pressure fluid means for effecting shifts in the transmission, wherein the control circuiting is arranged to make the control circuiting for the shift effecting means independent of the ignition interruption control circuiting.

Other objects and features of my invention will be apparent from the following description wherein:

Figure 1 is a diagrammatic plan view of the driving power plant for the vehicle;

Figure 2 is an elevational view partly in section of my invention as applied to a semi-automatic four speed forward and reverse transmission, a part of the control system being substantially illustrated, the manually operable clutch sleeve being shown in its forward or high range position for starting the vehicle from rest, and the power shiftable mechanism and power operable clutch sleeve being shown in the released position of the latter; and Figure 3 is an elevational view similar to a portion of that in Figure 2 and showing the power shiftable clutch sleeve in its direct drive or engaged position and the power shifting mechanism in the corresponding position.

In the drawings in which similar numerals indicate similar parts of the structure, Figure 1 illustrates a typical motor vehicle power plant having a conventional engine A for transmitting power through a propeller shaft 10 to drive the rear ground wheels 11. In the housing B there may be provided a fluid power transmitting device, such as a fluid coupling arranged in tandem with a master friction clutch of known type, the latter being releasable to uncouple the engine from the transmission by operation of a conventional clutch pedal 12. Rearwardly of the housing B is a transmission C which may be of any type incorporating positively engageable drive control elements of a character usually subject to substantial thrust or torque load in operation, the latter conditions making the use of some form of unloading means desirable to insure release of the drive control elements when a speed change requiring disengagement of these elements is necessary.

The transmission C may be of various known types. For purposes of illustration I have shown in Figure 2, a commerical form of four-speed and reverse countershaft underdrive transmission. This transmission comprises an input or driving shaft 13 which receives drive from the engine A by way of the clutch assembly B, and an output or driven shaft 14 which is adapted to transmit drive to the propeller shaft 10. The driving shaft 13 carries the main driving gear or pinion 15 and a set of positive jaw clutch teeth 16 which are adapted to be engaged by the teeth of a jaw clutch sleeve D. As will be hereinafter seen, the sleeve D together with the clutch teeth 16 comprise relatively movable drive control elements for effecting stepup and stepdown manipulation of the transmission.

The clutch sleeve D is slidably splined on teeth, not shown, of a forward hub portion of the high or third speed gear 22 which is rotatably journalled on the driven shaft 14 and adapted to be clutched thereto through a jaw clutch sleeve F slidably splined on a hub, not shown, drivingly carried by the shaft 14 and interengageable with jaw clutch teeth 26 carried by the gear 22. The forward shift of sleeve D for clutching with teeth 16 is normally controlled or impeded by a toothed blocker E whereby clutching is limited to synchronous relationship in the speeds of rotation of gears 15 and 22 and, in the particular construction illustrated, limited to engine coast conditions obtainable by accelerator releasing movement to secure deceleration of the engine. The blocker E is journalled on a conical surface, not shown, carried by the shaft 13 against which it is frictionally urged by a spring, also not shown, and has a limited lost motion connection with the sleeve D or gear 22 whereby it may rotate to place its teeth in blocking relation to the teeth of sleeve D whenever the gear 15 rotatably leads or lags the sleeve D. When sleeve D moves past the blocker E into engagement with the clutch teeth 16, the gears 15 and 22 are placed in a two-way direct drive relationship.

Gear 22, as stated above, is loosely journalled on the driven shaft 14 whereas the pinion 15 is part of the input shaft 13. Also loosely journalled on the output shaft 14 is a low or first speed gear 27 having jaw clutch teeth 28 engageable by the sleeve F. Associated with the sleeve F on each side thereof is any commercial type of blocker synchronizers 29 such that clutch F may be shifted from a neutral position disengaged from teeth 26 and 28 forwardly to a high range position to synchronously clutch shaft 14 with the high speed gear 22 through the teeth 26 or rearwardly to a low range position to synchronously clutch shaft 14 with the low speed gear 27 at its teeth 28. Manual shifts of the sleeve F are facilitated by release of the main clutch at B by means of the clutch pedal 12.

Gear 22 is also adapted to be driven from gear 15 at a speed different from 1:1 and to this end I have shown a countershaft type one-way reduction driving means between these gears. This drive comprises the coaxially rotatable countershaft gear 30 and cluster gear 31, wheels 32, 33 respectively, in constant mesh with gears 15, 22, and 27 and an overrunning roller clutch G operably interposed therein between the gear 30 and cluster 31. A stationarily mounted countershaft 34 provides a journal support for the countershaft gears. Assuming the usual clockwise rotation of shaft 13 as viewed when looking from front to rear of Figure 2, then overrunning clutch G will automatically clutch gear 30 and cluster 31 together when gear 30 is driven counterclockwise at a speed tending to exceed that of the cluster 31 and automatically release the drive between these gears to allow gear 30 to slow down below the speed of cluster 31. For obtaining reverse drive an idler gear (not shown) having constant mesh with the gear 33 is shiftable rearwardly into mesh with a gear 35 fixed on shaft 14, the clutch F being then in its neutral position disengaged from teeth 26 and 28.

As thus far described, it will be apparent that with the parts arranged as in Figure 2, sleeve F being then in high range position engaged with teeth 26, drive of shaft 13 will cause the output shaft 14 to be driven at a reduction drive (third speed) through the gears 15, 30 overrunning clutch G, gears 32, 22 and sleeve F. Should the sleeve D be biased forwardly during this reduction drive, blocker E will obstruct sleeve D in an intermediate position of its shift preventing ratcheting of its teeth with the teeth 16. However, if the driver releases the engine throttle control in the form of the usual accelerator pedal then, as will be apparent, overrunning clutch G will allow gear 15 and teeth 16 to slow down relative to the sustained speed of gear 22 and when the speed of gear 15 reaches synchronism with that of gear 22, blocker E will move to an unblocking position and allow sleeve D to move further forwardly to clutch its teeth with teeth 16 to the position shown in Figure 3, to provide the direct drive (fourth speed), clutch G continuing its overrunning operation. Upon return of sleeve D to disengaged position shown in Figure 2, followed by speeding up the engine, overrunning clutch G will automatically engage to restore the reduction drive.

When clutch sleeve F is shifted rearwardly to low range position to clutch gear 27 to shaft 14 an overrunning slow speed drive (first speed) is transmitted from the shaft 13 to the shaft 14 by way of the gears 15, 30, overrunning clutch G, gears 33 and 27 and sleeve F. At such time as the sleeve D is biased forwardly and the shaft 13 is allowed to slow down to permit the teeth 16 to become synchronized with the sleeve D, the sleeve will move past the blocker E and clutch with the teeth 16 to establish a two-way relatively fast speed drive (second speed) in the low range, which drive will be from the shaft 13 through the sleeve D, gears 22 and 32, gears 33 and 27, and clutch F to the shaft 14, the clutch G overrunning by reason of the cluster 31 rotating at a higher speed forwardly than the gear 30.

It will be understood the driver may start the vehicle from rest in the low range drive and subsequently shift to the high range incident to momentary release of the master clutch and this either prior to or subsequent to engagement of the clutch D. Most drivers, however, usually start the vehicle from rest in the slow speed ratio of the high range and at a subsequent higher speed obtain the automatic upshift to direct drive by momentary release of the accelerator pedal described above.

A more complete description of the transmission specifically illustrated in this application and its method of operation is set forth in the patent to A. J. Syrovy et al. 2,490,604 aforesaid.

A speed responsive governor means O is provided to control forward bias of the sleeve D as well as rearward bias thereof as will be presently more apparent. Moreover, during drive in either second or fourth speeds referred to above, a downshift to first or third speeds respectively may be effected by way of overruling the governor O through driver depression of the accelerator pedal M to substantially wide open throttle position, which operation is referred to in greater detail below.

As seen in Figure 2, I have illustrated a servomotor H by which to obtain power actuation of the clutch sleeve D, the motor here illustrated being of the pressure differential and spring operated type and in the disclosed embodiment functioning by means of fluid pressure. This motor preferably comprises a cylinder 36 slidably receiving a piston 37. The piston slidably receives a shift rail or rod 38 mounted to operate in the guideways 39 and 40. Fixed to rod 38 is a yoke 41, a hub portion 42 of which is secured to the rod 38 by means of a dowel screw 43. The rod 38 and yoke 41 constitute motion transmitting means S for the sleeve D, the yoke 41 as seen in Figure 2, having fingers 44 engaging in a groove 45 of the sleeve D to effect shift thereof.

A relatively small preloaded engaging spring 46 surrounds the rod 38 and is disposed between the hub of piston 37 and the hub 42 of the yoke 41. This spring 46 provides a lost motion thrust transmitting connection between the piston 37 and the hub 42 of the motion transmitting means S such that the piston 37 may be moved forwardly (to the left in Figure 2) for its power stroke, the piston 37 continuing its forward motion by fluid pressure even after the clutch D has been moved against the blocker E until the lip 47 of the piston uncovers the relief portion 48 of the cylinder 36 whereupon forward movement of the piston 37 will cease, the fluid pressure being then expended through the relief port 48.

During the said forward movement of the piston 37 the engaging spring 46 is compressed and urges the rail 38 through the hub 42 of the yoke 41 forwardly thus in turn shifting the clutch sleeve D to its intermediate position blocked by the blocker E. Subsequently upon synchronous rotation of the teeth 16 and sleeve D being obtained in response to accelerator releasing movement, the sleeve D is moved through the blocker E into engagement with the teeth 16 of the drive pinion 15, which is its fully engaged upshifted position shown in Figure 3, establishing the previously described direct drive between the shaft 13 and gear 22.

A relatively large preloaded downshift or kickdown spring 49 is disposed between an abutment ring 50, located at the forward end of the cylinder 36, and the piston 37. This spring serves to return the piston 37 and sleeve D from their Figure 3 positions to their downshifted or disengaged position shown in Figure 2. It will be observed from Figure 3 that the piston 37 when in its furthest forward position shown in this figure uncovering the port 48 has moved further than the shift rail 38 such that a gap 51 is created between the piston 37 and a shoulder 52 of the portion 53 of the shift rail. This gap 51 facilitates a lost motion movement of the piston 37 relative to the shift rail 38 prior to disengaging movement of the sleeve D which can only commence following abutment of the piston 37 with the shoulder 52. As previously noted, forward movement of the piston 37 is stopped upon uncovering the port 48, the latter permitting any excess pressure required to hold the piston 37 in its furthest position to be relieved and preventing the building up of such excess pressure in the cylinder.

The pressure fluid supply system is shown in Figure 2 and comprises a suitable supply source 60, which is usually the transmission sump. A pump Q of the rotary gear type is mounted on the shaft 14 and has its rotor 61 driven by that shaft, oil being drawn from the supply source 60 through the conduit 62 to the pump inlet 63 and is delivered under pressure at the pump outlet 64 to the conduit 65 and then to the passage 66 under control of a ball valve K. A relief valve, generally designated by the numeral 67 and provided at the pressure side of the pump between the outlet 64 and the ball valve K, serves as a relief valve in the event the valve K is not open in normal operation of the transmission to thereby permit pressure fluid trapped behind the piston 37 to be dumped back into the transmission sump 60 through the conduit 67a.

When the valve K is closed, oil under pressure is forced directly from the pump through the passage 66 to the cylinder 36 where it moves the piston 37 forwardly to effect forward movement of the shift rail 38 in the manner described above whereby the shift sleeve D is operated from its disengaged position in Figure 2 to its engaged position of Figure 3 to establish second or fourth speed ratio drive depending upon whether the clutch F is engaged with the first speed gear 27 or with the third speed gear 22.

Valve K is closed by bias of a valve spring 68 acting against a ball 69 to close a discharge port 70 opening into a passage 71 draining to the sump or supply source 60. The valve K is actuated to its open position under control of an electromagnetic device comprising a solenoid L having a plunger 72 connected with the movable core of the solenoid. The valve K is closed when the solenoid L is deenergized. The spring 68 then actuates the ball 69 against a seat 73 to close the port 70 and effects movement of the solenoid plunger 72 to its retracted position. The valve K is open when the solenoid L is energized, the solenoid core then moving the plunger 72 downwardly to push the ball 69 off the seat 73 of port 70. The oil may now flow from the pump Q through the conduit 65, port 70, passage 71, back to the sump 60.

When the valve K is open, it is impossible for sufficient fluid pressure to develop in the passage 66 to move the piston 37 against the force exerted by the piston return spring 49 which then maintains the piston at the extreme rearward position of its capable movement. Hence the piston 37 is actuated by fluid pressure only to establish second and fourth speeds respectively at which time the valve K is closed and the solenoid L deenergized. Figure 2 shows the valve K in its open position and the piston 37 in its position retracted by spring 49, and Figure 3 shows the valve K in its closed position and the piston 37 in its furthest forward position under control of the pressure fluid.

Energization and deenergization of the solenoid L is brought about by operation from one position to another of either of two control members, one actuated in response to vehicle speed, and the other in response to manipulation by a driver control member. One of these control members is a switch N operated by the governor O, and the other is a kickdown switch generally designated by the letter P.

As noted above, prior control circuits and structures providing the ignition primary coil and the solenoid L in parallel arranged circuits made it possible for the solenoid L to act as a parallel impedance of low value to the primary coil and weaken the spark delivered by the secondary at the plugs 74 when current flow thereto took place. A feature of the present invention is to overcome this difficulty and in order to accomplish this I preferably employ what are in effect double pole single throw switches in the governor and kickdown mechanisms and provide suitable electrical circuit means for effectuating the control operation of the governor and kickdown switches over the solenoid L.

As seen in Figure 2, a suitable source of electrical energy, for example, a storage battery 75 has one side grounded as at 76 by a conductor 77 and its other side connected by a conductor 78 through an ammeter 79 to the ignition switch 80. A conductor 81 connects the ignition switch with one terminal 82 of the solenoid L, the other terminal 83 of the solenoid L being connected by a conductor 84 with a terminal 85 of one pole of the double pole single throw governor switch N, the other terminal 87 of this pole being connected to a ground 88 by a conductor 89. From the governor switch terminal 85 a conductor 90 extends to a terminal 91 of one pole of the double pole single throw kickdown snap switch P, the other terminal 92 of this pole being connected to a ground 93 by a conductor 94.

The ignition mechanism generally designated by the letter J is of conventional type and includes an ignition coil 96, a distributor 98, and a breaker 100. From the primary coil 102 an ignition grounding circuit is provided that extends through the conductors 104, 106 to a terminal 108 of a normally open interrupter switch T and then from a terminal 110 thereof to a terminal 112 of the other or second pole of the governor switch N by means of a conductor 114. The second terminal 116 of this second pole is connected to ground 88 provided by the governor O through conductors 118, 89, it being noted that the terminal 116 is in effect common with the terminal 87. The switch T may also be connected with ground 93 of the kickdown switch. Thus a conductor 120 connects the conductor 114 and a terminal 122 of the other or second pole of the kickdown switch P, the second terminal 124 of the pole connecting with ground 93 through conductor 94. It will be noted that the terminals 92 and 124 are in effect common terminals.

The governor switch N is closed by a movable switch bar comprising conductor sections 126 and 128 insulated from each other. The bar is operated by an insulated sliding sleeve 130 of the governor O. The switch N is closed when the section 126 bridges the terminals 112, 116 and the section 128 bridges the terminals 85, 87.

The kickdown switch P is of the snap type and has a pivotal switch bar comprising insulated conductor sections 132, 134 which close the switch when the section 132 bridges the terminals 122, 124 and the section 134 bridges the terminals 91, 92. The switch bar, as shown in Figure 2, is held in open position under control of a coil spring 140 which also biases the accelerator M to its released position.

The accelerator M is suitably connected with the usual engine carburetor throttle valve by means including linkage 142, 144 which serves to open and close the throttle valve. Interposed in the throttle valve operating linkage is a lever 150 pivotally supported at 151 and having spaced fingers or projections 152, 153 for operating the actuating finger 154 of the snap switch P. The mechanism is preferably arranged such that in operation, the switch finger 154 is engaged by the lever projection 152 as the throttle valve in response to depression of the accelerator M approaches its full open throttle position, so that the switch P is closed with snap action during approximately the last 5° or so of the throttle opening movement. It will be understood that the operation of this switch may be adjusted to occur subsequent to full open throttle position by the provision of suitable lost motion mechanism such as disclosed in the patent to Neracher et al. 2,455,943. When the accelerator M is released, the finger 153 comes into contact with the actuating finger 154 of the switch near the fully released position of the accelerator to actuate the switch P to its open position, again by snap action, the parts being so arranged that the switch P will be opened by finger 153 whenever the accelerator pedal is fully released.

It will be observed that in the described circuiting, the ignition interruption circuit is by means of the double pole switches made independent of the solenoid L circuit so that when the interrupter switch T is closed during upshifting, a common ground will not be then provided for the primary coil 102 and the solenoid L.

It will also be noted that the piston 37 has its outer skirt 160 reduced at 161 adjacent the cammed portions 162, 163 for controlling operation of the ignition interrupter switch T of known type. This switch is biased to open position by a spring 164 and has its operating stem engaging a ball 166 so arranged in association with the piston portion 160 that switch T is open when the piston is in the Figure 2 position and in the Figure 3 position of forward movement of the piston. However, as the cammed portions 162, 163 move by the ball 166 in either direction of movement of the piston, the ball 166 is actuated to close the switch. Thus in the forward movement of the piston the cammed portion 162 operates the ball and the cammed portion 163 permits the ball to return to the open position of the switch by dropping in the reduced portion 161 of the piston, the ball being shown in this position in Figure 3. On the downshifting movement of the piston the cammed portion 163 actuates the ball 166 to close the switch T and the cammed portion 162 permits the ball to return to the open position of the swtich T.

The operation of the transmission and control system will now be described. Let it be assumed that the vehicle is at a standstill with the manual sleeve F shifted forwardly in engagement with the teeth 26 of the third speed gear 22, as seen in Figure 2. At this time the governor switch N will be closed and provides a circuit from the battery 75 to the ground 88 by way of the conductors 81 and 84 and solenoid L thus energizing the latter whereby the solenoid rod 72 maintains the ball 69 of the valve K in its down position venting the motor H so that spring 49 holds the clutch sleeve D in the position shown in this figure. The interrupter switch T is open as shown, the ball operator 166 thereof being free of the skirt 160 of the piston 37. The kickdown switch P is also open since the accelerator pedal is released.

By depressing the accelerator pedal within its normal operating range, the vehicle is driven in third speed ratio drive. At some predetermined speed of vehicle travel, for example 12 to 14 M. P. H. (6 to 7 M. P. H. in first speed), the governor O actuates the switch N to open position thus breaking the circuit between the ground 88 and the conductors 84 and 114 respectively. The solenoid L is thereupon deenergized and the valve K closed by operation of the spring 68 which moves the ball 69 to close the port 70 at the entrance of the return passage 71, thus permitting pressure to be built up by the pump Q in the passage 66.

At the moment of operation of the solenoid L, the interrupter switch T is in open position, the parts being in the position shown in Figure 2. When the fluid pressure builds up sufficiently, the piston 37 moves forwardly for its upshift stroke and comes to rest at the position shown in Figure 3 where the relief port 48 is uncovered by the piston to relieve the fluid pressure and maintain the piston at this position. The forward movement of the piston 37 is utilized in compressing the springs 46 and 49. Initially, the spring 46 moves the motion transmitting means S and thereby the sleeve D to its blocked position against the blocker E. Then lost motion movement takes place between the piston 37 and the shift rail 38 during which the springs 46 and 49 continue to compress. During the lost motion movement, the skirt 160 of the piston has its cammed portion 162 move past the ball 166 of the switch T camming the ball 166 upwardly to close the switch T, the switch T remaining closed until the cammed portion 163 of the skirt 160 passes under the ball 166 at which time the ball drops into the recess or relief portion 161 of the piston to reestablish the switch T in open position. Thereafter upon accelerator release to synchronize the speeds of the sleeve D and the clutch teeth 16, the sleeve D is moved by the spring 46 acting upon the yoke 41 of the motion transmitting means S, to its engaged position shown in Figure 3. During this engaging movement, the rail moves forwardly relative to the piston 37, the latter remaining in its position shown in Figure 3, uncovering the port 48.

Although the switch T is operated during the forward movement of the piston, the spark delivered by the secondary coil of the ignition system at the plugs 74 will not be weakened for the reason that the circuiting for the solenoid L is maintained independent of the ignition circuiting by the switch mechanism N, it being impossible at this time to condition the solenoid L and the primary coil 102 in a parallel circuiting through operation of the switch T.

Once established in fourth speed, a downshift to third speed is effected either by manually closing the kickdown switch P by means of the accelerator pedal M or by the automatic closing of the governor switch N when the speed of the vehicle drops below the upshift speed set for the transmission. For example, when the driver desires to manually effect the downshift from fourth speed to third speed, he fully depresses the accelerator M. During this operation, for example as the throttle approaches its full open position, the switch P is closed. Since the engine is then delivering its full power, it is desirable to effect torque relief at the teeth 16 to facilitate the release of sleeve D for the downshift. At this time the switch T is in its Figure 3 open position with the ball 166 in the recess 161 of the piston which is then in its position adjacent the relief opening 48. Moreover, the motion transmitting means S is in the fully engaged position of the sleeve D. Closing of switch P applies the ground 93 to the solenoid L circuit from the battery 75 causing energization of the solenoid L and opening of the valve K to vent the motor H.

As noted above, the interrupter switch T which connects by the conductors 104, 106 with the primary winding 102 of the ignition coil 96, is in series with the ground 93 established by the kickdown switch P through the conductors 114 and 120. Also when pressure is vented in the cylinder 36, the sleeve D usually initially remains engaged by reason of the engine torque on its teeth while the piston 37 begins its return movement under urging of the spring 49. Hence the piston will initially take up the lost motion 51 between itself and the shoulder 52 of the end portion 53 of the rail 38. During this lost motion movement the cammed portion 163 of the piston moves under the ball 166 of the switch T urging the ball upwardly to close the switch T and complete the circuit between the primary winding 102 and the ground 93 of the kickdown switch P, thereby grounding the ignition system. The engine now missing fire, unloads the torque on the teeth of the clutch member 16 and the teeth of the sleeve D, thereby permitting the spring 49 to effect disengagement of the sleeve D by moving the piston 37 and rail 38 further rearwardly and to complete the rearward or return stroke of the piston 37, rail 38 and sleeve D back to the position illustrated in Figure 2. During this return movement the cammed portion 162 of the piston passes under the ball 166 of the switch T permitting the switch to return to its open position restoring the ignition to normal operation. When subsequently the accelerator pedal M is released sufficiently to open the switch P, fourth speed ratio drive may again be restored as previously described provided the vehicle speed is still such that the governor switch N is open.

For the automatic downshift from fourth speed to third speed under control of the vehicle governor O, it is only necessary to reduce the vehicle speed to or below the speed at which the governor switch N normally closes. Closing of the switch N energizes the solenoid L by effecting a circuit from the battery 75 to the ground 83, the motor H is then vented as described above with respect to the kickdown operation of the transmission and the interrupter switch T is operated as there described.

When the sleeve F is in its rearward or low range position, the upshift and downshift movement of the sleeve D between first and second speed positions will be the same as that set forth for operation of this sleeve between third and fourth speed positions when the sleeve F is in its high range setting. However, since the governor O is driven from the countershaft as at 170, 171 in Figure 2, the governor O will function at a somewhat lower car speed depending upon the gear ratios for first and second speed as compared with third and fourth speed as will be readily understood. It will be understood, however, that the governor driving means 170 may, if desired, be on the driven shaft 14.

From the foregoing description of my invention, it will be apparent that I have provided a novel ignition interrupter control system and structure for transmissions having both governor and manually controlled downshifting where ignition interruption for disengaging engaged clutch elements is obtained as required, and operation of the interrupter means during upshifting operations will not cause any weakening of the spark delivered by the secondary of the ignition coil at the plugs at the time of current flow thereto.

It will also be apparent that the invention is applicable to other forms of transmissions. Moreover, although the disclosed embodiment of the invention is well adapted for carrying out the objects hereinabove set forth, it will be understood that various modifications, changes and subtitutions coming within the spirit of my invention and within the scope of the appended claims are also contemplated.

I claim:

1. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, actuating means operable upon said motion transmitting means for effecting shift of said shiftable drive control element between its two said positions, electromagnetic means for controlling said actuating means, governor means for controlling said electromagnetic means and ignition interruption switch means operable by said actuating means, said governor means including a pair of normally open switches operable when closed for controlling shift of said shiftable element from its said first position to its said second position, one of said switches being in series with said ignition interruption means and the other being in series with said electromagnetic means.

2. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, actuating means operable upon said motion transmitting means for effecting shift of said shiftable drive control element between its two said positions, electromagnetic means for controlling said actuating means, governor means for controlling said electromagnetic means, said governor means including a pair of substantially simultaneously operative normally open switches operable when closed for controlling shift of said shiftable element from its said first to its said second position, ignition interrupting switch means operable by said actuating means, circuit means including said interrupting switch and one of said pair of switches in series, and other circuit means including said electromagnetic means and the other of said pair of switches in series.

3. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, actuating means operable upon said motion transmitting means for effecting shift of said shiftable drive control element between its two said positions, electromagnetic means for controlling said actuating means, ignition interrupting switch means operable by said actuating means, governor means including a double pole single throw switch for controlling a pair of electrical circuits, one of said circuits including said ignition interrupting switch means and the other including said electromagnetic means.

4. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, actuating means operable upon said motion transmitting means for effecting shift of said shiftable drive control element between its two said positions, electromagnetic means for controlling said actuating means, ignition interrupting switch means operable by said actuating means, governor means including a double pole single throw switch, each pole comprising a pair of contacts and a bridging conductor operable for electrically connecting said contacts, one contact of each pair of contacts being grounded, the other contact of one pole electrically connecting said ignition interrupting switch means and the other contact of the other pole electrically connecting said electromagnetic means.

5. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, actuating means operable upon said motion transmitting means for effecting shift of said shiftable drive control element between its two said positions, electromagnetic means for controlling said actuating means, ignition means including a primary coil and an ignition interrupting switch in series with said coil, said switch being operable by said actuating means, governor means including double pole single throw switch means, and manually operable means including double pole single throw switch means, each pole of said double pole switch means comprising a pair of contacts and a bridging conductor operable for electrically connecting said pair, one contact of each pair of contacts being grounded, the other contact of one pole of each said switch means electrically connecting said ignition interrupting switch, and the other contact of the other pole of each said switch means electrically connecting said electromagnetic means.

6. A power transmission as claimed in claim 5 wherein the switch means of said manually operable means is operable by the accelerator pedal.

7. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, differential fluid pressure motor means including a piston, operable upon said motion transmitting means for effecting shift of said shiftable drive control element between its two said positions, a solenoid controlled valve for controlling operation of said motor means, ignition means including a primary coil and an ignition interrupting switch, and speed responsive governor means including switch means for simultaneously controlling the grounds of a pair of independent circuits, one of which includes said solenoid and the other of which includes said interrupting switch.

8. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, differential fluid pressure motor means including a piston, operable upon said motion transmitting means for effecting shift of said shiftable drive control element between its two said positions, a solenoid controlled valve for controlling operation of said motor means, ignition means including a primary coil and an ignition interrupting switch operable by said piston, speed responsive switch means operable for grounding a pair of circuits, one of which includes said solenoid and the other of which includes said interrupting switch, and driver operable switch means operable for grounding the same circuits.

9. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, a hydraulically operable motor including a piston, operable upon said motion transmitting means for effecting shift of said shiftable drive control element between its two said positions, a valve for controlling said motor, a solenoid for controlling said valve, ignition means including a primary coil and an ignition interrupting switch, cam means on said piston for operating said switch, speed responsive switch means operable for simultaneously grounding a pair of independent circuits one of which includes said solenoid in series with this switch means and the other of which includes said interrupting switch in series with this switch means, and accelerator operable switch means in parallel with said speed responsive switch means operable for grounding the same circuits.

LOUIS B. FORMAN.

REFERENCES CITED

The following references are of record in the file of this patent:

UNITED STATES PATENTS

| Number | Name | Date |
|---|---|---|
| 2,319,746 | Orr | May 18, 1943 |
| 2,328,291 | Osborne | Aug. 31, 1943 |
| 2,333,668 | Neracher et al. | Nov. 9, 1943 |
| 2,343,291 | Gilfillan et al. | Mar. 7, 1944 |
| 2,440,558 | Price | Apr. 27, 1948 |
| 2,565,494 | Gilfillan | Aug. 28, 1951 |